US008463587B2

(12) United States Patent
Zhu et al.

(10) Patent No.: US 8,463,587 B2
(45) Date of Patent: Jun. 11, 2013

(54) HIERARCHICAL ORDER RANKED SIMULATION OF ELECTRONIC CIRCUITS

(75) Inventors: Ningjia Zhu, San Ramon, CA (US); James Bair, San Jose, CA (US); Zhishi Peng, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 699 days.

(21) Appl. No.: 12/511,030

(22) Filed: Jul. 28, 2009

(65) Prior Publication Data

US 2011/0029299 A1 Feb. 3, 2011

(51) Int. Cl.
*G06F 17/50* (2006.01)

(52) U.S. Cl.
USPC ............... 703/14; 703/13; 716/105; 716/132

(58) Field of Classification Search
USPC ............................ 703/13–14; 716/105, 132
See application file for complete search history.

(56) References Cited

U.S. PATENT DOCUMENTS

| | | | |
|---|---|---|---|
| 5,313,398 A | 5/1994 | Rohrer et al. | |
| 5,446,676 A | 8/1995 | Huang et al. | |
| 5,553,008 A | 9/1996 | Huang et al. | |
| 5,715,184 A | 2/1998 | Tyler et al. | |
| 6,480,816 B1 | 11/2002 | Dhar | |
| 6,577,992 B1 | 6/2003 | Tcherniaev | |
| 7,111,269 B2 * | 9/2006 | Satapathy et al. | 716/102 |
| 7,127,384 B2 * | 10/2006 | Zolotov et al. | 703/14 |
| 7,181,383 B1 | 2/2007 | McGaughy et al. | |
| 7,324,363 B2 | 1/2008 | Kerns et al. | |
| 7,392,170 B1 * | 6/2008 | McGaughy et al. | 703/14 |
| 7,761,275 B2 * | 7/2010 | Chopra et al. | 703/14 |
| 2003/0110457 A1 | 6/2003 | Nadeau-Dostie et al. | |
| 2005/0143966 A1 | 6/2005 | McGaughy | |

OTHER PUBLICATIONS

Cai et al.: "Fast Simulation of Linear and Lightly Nonlinear VLSI Circuit Network", 1999 International Conference on Computational Electromagnetics and Its Applications, pp. 585-588.
Chang et al.: "Analytic Macromodeling and Simulation of Tightly-Coupled Mixed Analog-Digital Circuits", 1992 IEEE, 0-8186-3010-8/92, pp. 244-247.
Ho et al.: "The Modified Nodal Approach to Network Analysis", IEEE Transactions on Circuits and Systems, vol. CAS-22, No. 6, Jun. 1975, pp. 504-509.
Zhu et al.: "Two-Stage Newton-Raphson Method for Transistor-Level Simulation", IEEE Transactions on Computer-aided Design of Integrated Circuits and Systems, vol. 26, No. 5, May 2007, pp. 881-895.

* cited by examiner

*Primary Examiner* — Eunhee Kim
(74) *Attorney, Agent, or Firm* — Bever, Hoffman & Harms, LLP; Jeanette S. Harms (57) ABSTRACT

A method of simulating an integrated circuit design is provided. In this method, a node order ranking of nodes in a netlist can be determined. Circuits of the netlist can then be partitioned based on the node order ranking with both static current driving and dynamic current driving schemes. A hierarchical data structure can be built based on the node order partitioning. In one embodiment, intermediate node orders can be dynamically merged for simulation optimization. Then, the circuits can be re-partitioned based on one or more merged intermediate node orders. Solving and integration can be performed using the hierarchical data structure to generate an order-ranked hierarchy engine. Analysis on the order-ranked hierarchy engine can be performed. At this point, simulation data of the IC design can be exported based on the analysis. By using this method, linear network reduction with its attendant accuracy loss is unnecessary.

17 Claims, 9 Drawing Sheets

HIERARCHICAL ORDER RANKED SIMULATION OF ELECTRONIC CIRCUITS

BACKGROUND OF THE INVENTION

1. Field of the Invention

The present invention relates to the simulation of a complex, large integrated circuit design, and in particular to performing solving and integrating of the nodes of a circuit based on their node topology and physics, which includes both node order and inter-nodal coupling relationships, thereby ensuring a faster, more accurate, more stable, overall simulation of an integrated circuit design.

2. Related Art

Integrated circuit (IC) designs today are becoming increasing complex because of additional desired functionality. Moreover, ever-smaller technology nodes, e.g. down to 45 nm or less, may require design modifications that at 100 nm were unnecessary. Because of these factors, the accurate simulation of these ICs is necessary to ensure proper circuit performance.

Linear network reduction (LNR), which provides simplified models that approximate circuit behavior, can be used during simulation. Indeed, without LNR, a target matrix of a typical IC design is so large that simulating post-layout circuits makes DC analysis (which determines the operating point of a circuit, i.e. defining the initial condition (time=0) of the dynamic components in the circuit) and TR analysis (which uses a transient/time domain, starting at time=0 and through a plurality of clock cycles) extremely slow. Unfortunately, LNR is having significant problems at current technology nodes, e.g. at 45 nm. As described below, these problems can result in significant inaccuracies and even instability.

Figure 1A:
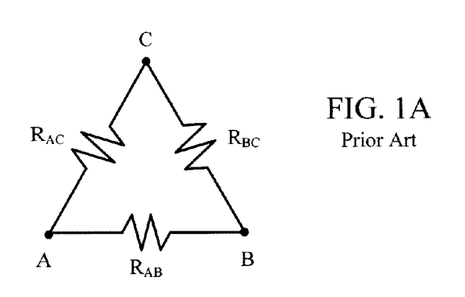
FIG. 1A illustrates a graph of a simple 3-node circuit.
Figure 1B:
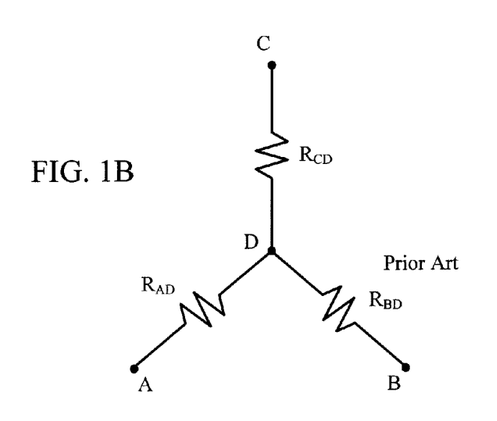
FIG. 1B illustrates a graph of an equivalent 4-node circuit to that of FIG. 1A.

Note that a circuit can be represented using a graph comprised of nodes and edges, wherein the edges are effectively models of devices and the nodes connect the edges. FIG. 1A illustrates a graph of a simple 3-node circuit having nodes A, B, and C, with edges $R_{AB}$, $R_{BC}$, and $R_{AC}$. FIG. 1B illustrates a graph of an equivalent 4-node circuit that can be created using a delta-wye transformation, wherein the 4-node circuit includes nodes A, B, C, and D and edges $R_{AD}$, $R_{CD}$, and $R_{BD}$.

Notably, the Kirchoff laws can be applied to node/edge graphs. For example, Kirchoff's current law (KCL) states that the algebraic sum of all currents flowing out of and into any circuit node is zero. Thus, in reference to FIG. 1A or 1B, the current flowing into node B is equal to the current flowing out of node B. KCL is therefore described as a nodal equation. On the other hand, Kirchoff's voltage law (KVL) states that the directed sum of the electrical potential differences, i.e. voltages, around any closed circuit must be zero. Thus, the sum of the voltages of the loop formed by nodes A, B, and C in FIG. 1A is equal to zero. KVL is therefore described as a loop equation. Simulation attempts to solve both the KCL and KVL equations at each clock cycle.

Figure 2:
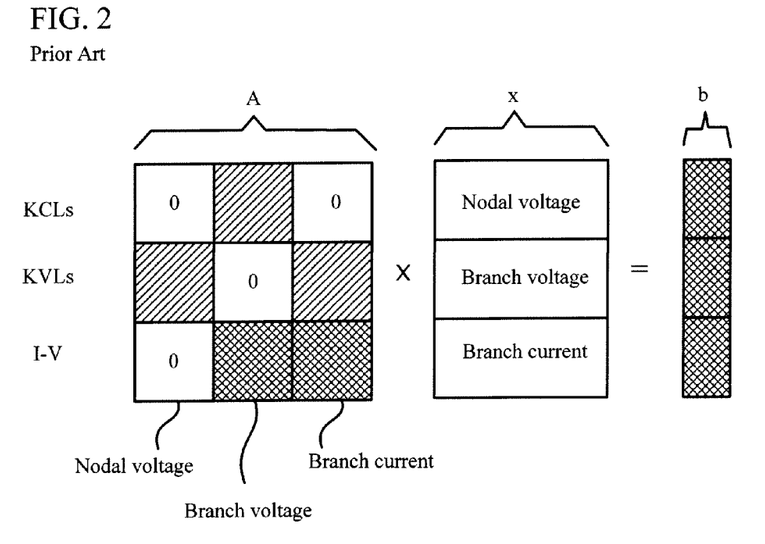
FIG. 2 illustrates a SPICE matrix equation that can represent a circuit graph.

SPICE (simulation program with IC emphasis) effectively builds a linear model at an operating point and then constructs one matrix equation, i.e. Ax=b (wherein "A" is an incidence matrix that represents the graph, "x" are the unknowns that represent nodal voltages, branch voltages, and branch currents, and "b" is a known vector column contributed by ideal sources, which is shown in FIG. 2. The matrix "A" can include KCL (linear) equations, KVL (linear) equations, and I-V (current-voltage) (non-linear) equations. Note that a modified nodal analysis (MNA) can be used instead of the matrix equation shown in FIG. 2. This MNA approach is described, for example, in "The Modified Nodal Analysis to Network Analysis", Chung-Wen Ho et al., IEEE Transactions On Circuits And Systems, VOL. CAS-22, NO. 6, June 1975. Notably, the MNA approach also includes a matrix equation that exhibits the same disadvantages as those described in reference to FIG. 2. Those skilled in the art of circuit simulation understand various matrix equations, which are therefore not explained in further detail herein. Because of its simplicity, the matrix equation shown in FIG. 2 is used for explanation purposes.

In general, linear equations have derivatives higher than the first order equal to zero, whereas non-linear equations have non-zero derivatives higher than the first order, as expressed by the Taylor series, shown below for reference and which is known by those skilled in the art of simulation.

$$\sum_{n=0}^{\infty} \frac{f^{(n)}(a)}{n!}(x-a)^n$$

where n! denotes the factorial of n and f(n) denotes the nth derivative of f evaluated at the point a (the zeroth derivative of f being defined to be f) (wherein $(x-a)^0$ and 0! are defined to be 1). To solve Ax=b, one direct method is $x=A^{-1}b$. Another more typical method for circuit simulation is an iterative approach that requires convergence.

Unfortunately, mixing linear and non-linear equations in the matrix causes unnecessary matrix calculations for the linear equations. That is, solving for non-linear components requires more iterations than solving for linear components. If non-linear components are represented in the matrix, then linear components are subject to the same number of iterations performed for the highest order non-linear component (i.e. the non-linear component having the highest number of corresponding derivatives to accurately describe its behavior). Because of the single matrix used as well as linear/non-linear mixing in that matrix and its requisite iterations, SPICE is typically used to simulate ICs having relatively few circuits (e.g. ICs having under 100,000 gates).

Figure 3A:
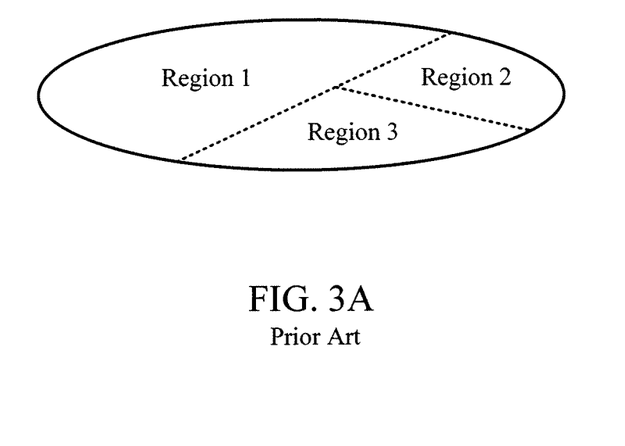
FIGS. 3A and 3B illustrate exemplary Fast SPICE implementations.
Figure 3B:
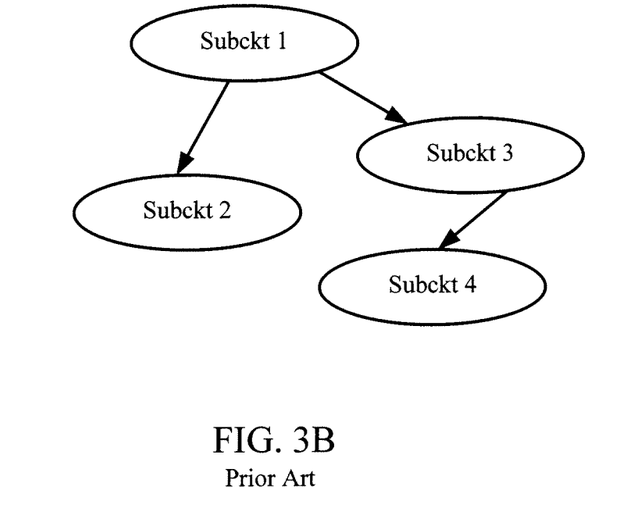

Fast SPICE is a technique for speeding up simulation for large, highly complex ICs (e.g. ICs having over 1 million gates). To achieve this goal, Fast SPICE partitions a design into multiple parts, thereby allowing multiple matrices to be used. Exemplary Fast SPICE implementations are represented in FIGS. 3A and 3B. For example, FIG. 3A illustrates a conventional flattened structure including regions 1, 2, and 3. In this case, the original matrix is split into a number of weekly coupled regions based on circuit topology and the underlying device physics, which are solved in a quasi-independent manner. Coupling between the circuit regions is reintroduced by a variety of techniques external to the matrix solution. Exemplary simulation products offered by Synopsys, Inc. using this flattened structure include NanoSim® and XA™. FIG. 3B illustrates an exemplary, simplified hierarchical structure in which sub-circuit 1 includes sub-circuits 2 and 3, and sub-circuit 3 includes sub-circuit 4. In this case, the matrix solver attempts to make use of repeated patterns within the matrix structure that reflect the underlying circuit's hierarchical design. Exemplary simulation products offered by Synopsys, Inc. using this hierarchical structure include HSIM®. Unfortunately, for either implementation, mixing linear/non-linear devices and nodes in a region/sub-circuit can cause significant inaccuracies (just as with a single matrix). Further, coupling can occur between regions/sub-circuits, thereby requiring further modeling (and simulation time) or risk increasing simulation inaccuracies.

Therefore, a need arises for an improved technique that provides accurate simulation for large, complex ICs including both linear and non-linear components.

SUMMARY OF THE INVENTION

A method of simulating an integrated circuit design is provided. In this method, a node order ranking of nodes in a netlist can be determined. Circuits of the netlist can then be partitioned based on the node order ranking. The term "node order" can be defined as being proportional to the maximum value of a predetermined derivative ratio, e.g. a derivative ratio based on the derivative of I(V) with respect to V (for DC static behavior) or a derivative ratio based on the derivative of I(V,dV/dt,t) with respect to dV/dt (for transient dynamic behavior), from each device that connects to the node being characterized. In one embodiment, the pre-determined derivative ratio can be based on the second derivative divided by the first derivative, such as $(\partial^2 I/\partial V^2)/(\partial I/\partial V)$, $(\partial^2 I/\partial(dV/dt)\partial V)/(\partial I/\partial V)$ or $\partial^2 I/\partial(dV/dt)^2)/(\partial I/\partial V)$.

Notably, this partitioning can also be performed based on each node's topology and physics. A node's topology and physics can include node order and its coupling between its own node and neighboring nodes through models, such as, a specific transistor model with a defined maximum current under certain biases (e.g. 0 to VDD).

A hierarchical data structure can be built based on the node order partitioning. In one embodiment, intermediate node orders can be dynamically merged for simulation optimization. Then, the circuits can be re-partitioned based on one or more merged intermediate node orders under a cost function which determines a tradeoff between more levels of node order ranking with small regions and less levels with big regions. Solving and integration can be performed using the hierarchical data structure to generate an order-ranked hierarchy engine. Analysis on the order-ranked hierarchy engine can be performed. At this point, simulation data of the IC design can be exported based on the analysis.

In one embodiment, the partitioning of the circuits can include determining the couplings between pairs of nodes in the circuit. Determining the coupling can include determining a conductance between two nodes. In this case, partitioning can include placing the two nodes in a same region when the two nodes have a same order and the conductance is greater than a predetermined value. In another embodiment, determining the coupling can include determining a capacitance between two nodes. In this case, partitioning can include placing the two nodes in a same region when the two nodes have a same order and the capacitance is greater than a predetermined value.

In simulation, the partitioned regions can be scheduled in a number of time slots determined by a static current driving scheme. A dynamic current driving scheme can determine the order of solving for regions scheduled for the same time slot. In one embodiment, solving proceeds from top to bottom (wherein "top" indicates a highest non-linearity, i.e. highest node order, and "bottom" indicates a lowest non-linearity (highest linearity), i.e. a lowest node order) and then from bottom to top. Each region with lower order solves for port behavior and feeds back the information to its above region with higher order.

In one embodiment, a computer-readable medium storing computer-executable instructions for simulating an integrated circuit design is also described. These computer-executable instructions when executed by a computer perform the above-described steps.

DETAILED DESCRIPTION OF THE DRAWINGS

Most standard IC designs today include a wide range of components, whose behavior may be characterized as being linear, first-order non-linear, and higher-order non-linear. Current partition algorithms in IC simulators perform partitioning based on circuit topology and coupling strength. Thus, the resulting partitions usually include both linear and non-linear devices and nodes, which significantly increase simulation processing and time.

Moreover, an increasing number of designs include both digital and analog circuits on the same IC (called mixed signal technology). These mixed signal circuits typically include multiple high-order non-linear components (wherein the higher the order of the non-linear component, the more derivatives needed to accurately define its behavior). Notably, solving for a first-order derivative typically uses a large step (delta value) to achieve an accurate result, whereas solving for higher-order derivatives typically uses smaller steps to achieve accurate results. Unfortunately, a simulator tool can be ill-equipped to negotiate with the inherent step differences between first- and higher-order derivatives.

Specifically, simulator tools that opt for using the smaller step size have significant increases in simulation times, whereas simulator tools that opt for using the larger step size sacrifice accuracy and risk simulation instability. To address this problem, some simulation tools include model order-reduction algorithms to provide simulation performance improvement. Unfortunately, these algorithms can introduce significant inaccuracies and instability.

In accordance with one aspect of an improved simulation technique, node order can be advantageously used to provide increased simulation accuracy and performance. Specifically, as described in further detail below, this technique can partition circuit blocks using different orders of node non-linearity. Based on this partitioning, hierarchical solving and integrating can be performed stably.

Note that a netlist describes the devices of an IC design and the connectivity of those devices using nets. A netlist can be hierarchical or flattened. A hierarchical netlist can include "primitives" (i.e. non-divisible instances) as well as sub-circuits (i.e. including multiple primitives) to allow for higher level abstraction of the circuit. In contrast, a flattened netlist only includes primitives.

In one embodiment, to simplify order-ranked partitioning, an IC design provided as a hierarchical netlist can first be optimized with no attendant accuracy loss (such that it changes from FIG. 1B to FIG. 1A) and then flattened schematically (either locally or globally). Initially, each node is assigned a "node order" and the total set of nodes in the netlist can be partitioned into groups having the same (or close) order. As used herein, the term "node order" can be defined as being proportional to the maximum value of a derivative ratio, e.g. a derivative ratio based on the derivative of I(V) with respect to V (based on DC static behavior) or a derivative ratio based on the derivative of I(V, dV/dt, t) with respect to dV/dt (based on transient dynamic behavior), from each device that connects to the node being characterized.

Note that with respect to the DC static behavior (i.e. at t=0), a sweep of the device model using a range of values from 0 to X (wherein X is a maximum voltage V, such as VDD) can be performed (hence, the term "with respect to V") to determine a maximum pre-determined derivative ratio. In one embodiment, the pre-determined derivative ratio can be based on the second derivative divided by the first derivative, such as $(\partial^2 I/\partial V^2)/(\partial I/\partial V)$.

In contrast, with respect to the transient dynamic behavior, a sweep of the device model using a range of voltage changes from 0 to X (wherein X is a maximum voltage V, such as VDD) over time with varied time steps can be performed (hence, the term "with respect to dV/dt") to determine a maximum pre-determined derivative ratio. In one embodiment, the pre-determined derivative ratio can be the second derivative divided by the first derivative, such as $(\partial^2 I/\partial(dV/dt)\partial V)/(\partial I/\partial V)$ or $(\partial^2 I/\partial(dV/dt)^2)/(\partial I/\partial V)$.

The partitioning may be further optimized based on each node's topology and physics, which can include any number of factors determining the physical or functional relationship between nodes in the circuit. An example of particular interest is the degree of coupling between itself and any other node in the circuit. Determining the coupling can include determining a conductance between two nodes. In this case, partitioning can include placing the two nodes in a same region when the two nodes have a same order and the conductance is greater than a predetermined value or dividing into separate partitions nodes for which the conductance is less than a predetermined value even if they are of the same order. In another embodiment, determining the coupling can include determining a capacitance between two nodes. In this case, partitioning can include placing the two nodes in a same region when the two nodes have a same order and the capacitance is greater than a predetermined value or dividing into separate partitions nodes for which the capacitance is less than a predetermined value even if they are of the same order.

Figure 4A:
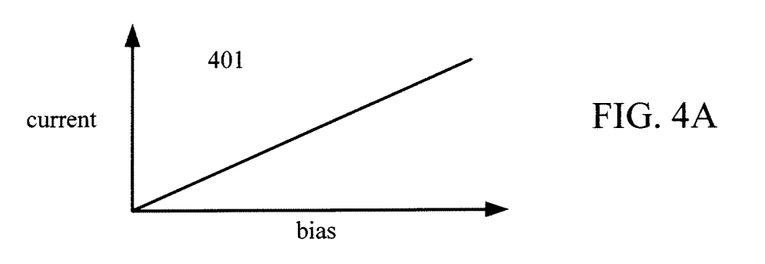
FIGS. 4A-4D illustrate exemplary shapes of node currents versus bias.
Figure 4B:
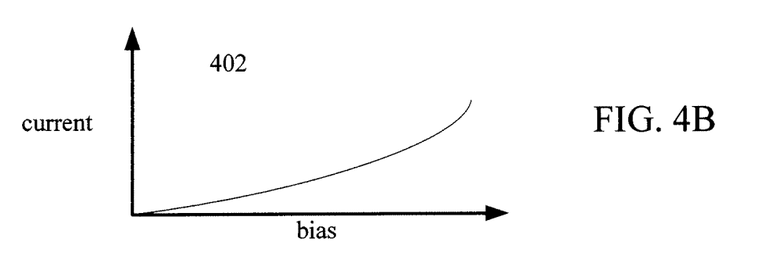
Figure 4C:
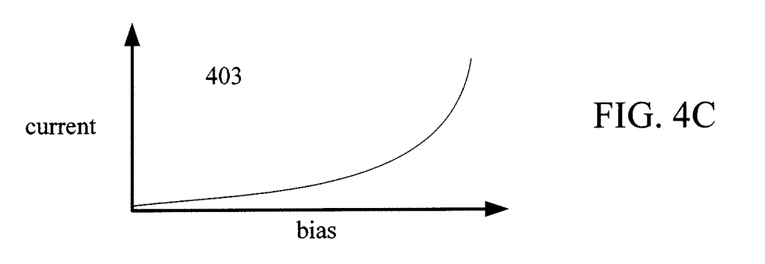
Figure 4D:
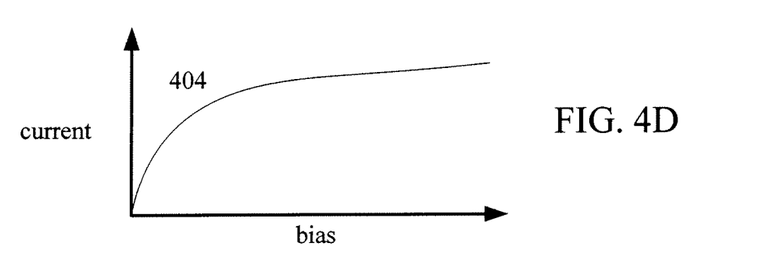

FIGS. 4A-4D illustrate exemplary shapes of linear or non-linear node currents in relation to bias. As used herein, the term "linear node" can generally be characterized as a node touching only linear devices or nothing, whereas the term "non-linear node" can generally be characterized as a node touching at least one non-linear device through non-linear current channels. For example, shape 401 of FIG. 4A illustrates a linear node coupled to, for example, a resistor (a generic current expressed as i=gv, wherein "i" is the current, "g" is a conductance, and "v" is the voltage/bias). Note that the second derivative of a line is zero and therefore, it is by definition linear. In contrast, shape 402 of FIG. 4B illustrates a non-linear node coupled to, for example, a bipolar junction transistor (BJT) (a generic current expressed as $i=f_{BJT}(v)$, wherein "f(v)" refers to a function of voltage/bias). Shape 403 of FIG. 4C illustrates a non-linear node coupled to, for example, a diode (a generic current expressed as $i=ce^v$, wherein "c" is a constant and "e" refers to an exponential function). Shape 404 of FIG. 4D illustrates a non-linear node coupled to, for example, a MOSFET (metal-oxide-semiconductor field-effect transistor) drain or source (a generic, exemplary current expressed as $i_{(drain-source)}=f_{MOSFET}(v)$, wherein "f(v)" refers to a function of voltage/bias).

The purpose of partitioning using (order, {coupling}) (wherein { } indicates (a current of) a set of maximum currents from/to between the analyzed node and any other neighbor nodes in the circuit) is to ensure that all the nodes in the matrix have the same (or close) order and have a pre-defined physics inter-relationship. Based on order-ranked partitioning, an improved hierarchical structure can be built.

Figure 5A:
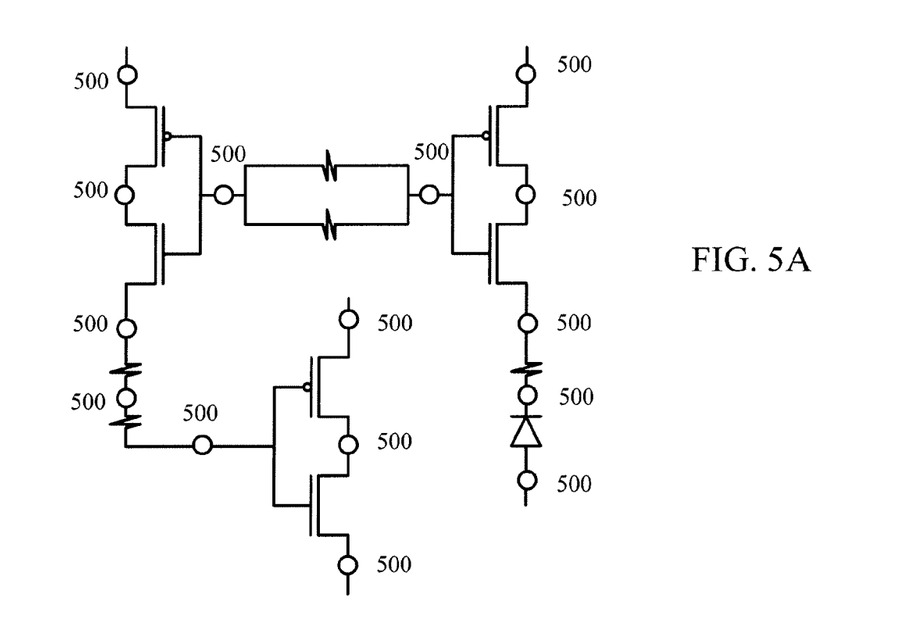
FIG. 5A illustrates a simplified circuit with its nodes identified.

FIG. 5A illustrates a simplified circuit including transistors, resistors, and a diode (exemplary primitives) as well as their interconnections. Nodes 500 in FIG. 5A are shown using circles. In accordance with one aspect of an improved partitioning, the order of nodes 500 can be identified. In this embodiment, a lowest order includes only linear nodes. In another embodiment, the ranking of the node orders can include a lowest order that has both linear and non-linear nodes.

Figure 5B:
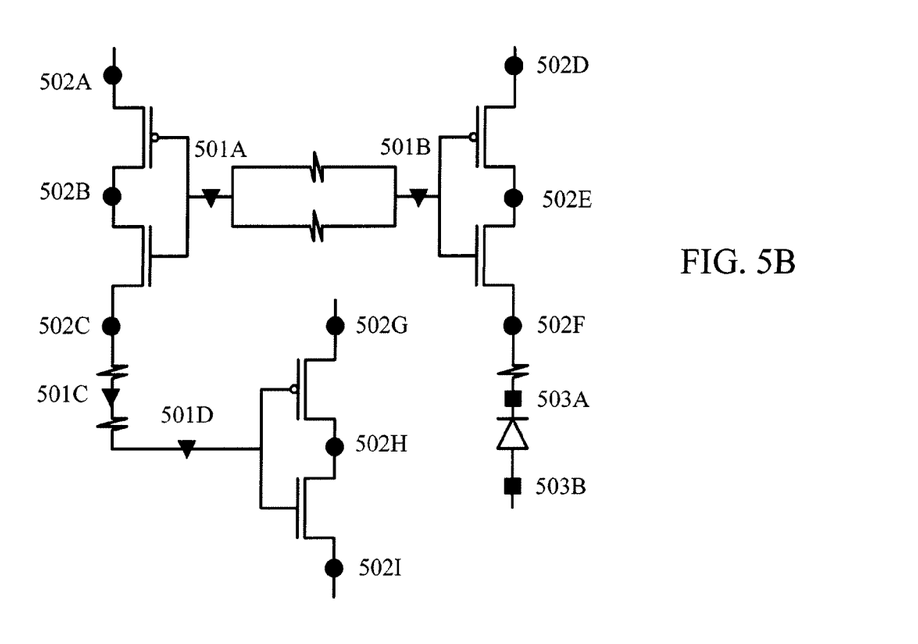
FIG. 5B illustrates the identified nodes of FIG. 5A with respective rankings determined.

In FIG. 5B, the lowest/zero order nodes 501 (e.g. nodes 501A-501D) are shown with black triangles, first order nodes 502 (one set of non-linear nodes)(e.g. nodes 502A-502I) are shown with black circles, and second order nodes 503 (another set of non-linear nodes requiring higher predetermined derivatives than first order nodes 502) (e.g. nodes 503A-503B) are shown with black squares.

Figure 5C:
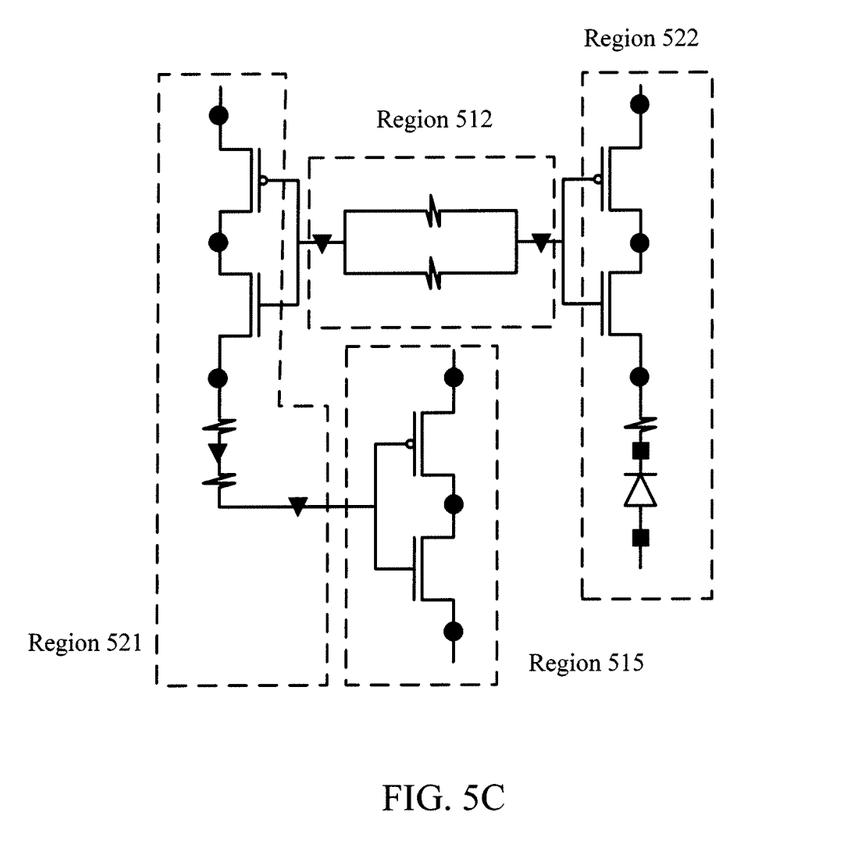
FIGS. 5C and 5D illustrate a partitioning of the simplified circuit of FIG. 5B based on the determined node rankings and coupling among nodes.

Partitioning of the circuit shown in FIG. 5B can be performed using a static driving scheme and then a dynamic driving scheme, which is controlled by node order. The static current driving scheme can group nodes based on channel connections. In one embodiment, the static current driving scheme can first identify homogeneous node order, driver-only sub-circuits and homogeneous node order, driven-only sub-circuits. For example, referring to FIG. 5C, a region 512 is a driver-only sub-circuit having zero order nodes, whereas a region 515 is a driven-only sub-circuit (having an inverter connected between VDD and VSS, which is not shown for simplicity) having first order nodes. The static current driving scheme can then group all other sub-circuits based on current dependencies, but ignoring node order. Thus, in addition to regions 512 and 515, the static current driving scheme can create regions 521 and 522.

As described in further detail below, the regions created by the static current driving scheme (four regions in the circuit shown in FIG. 5C) can advantageously determine the number of time slots used for analyzing the circuit (described in reference to FIG. 5E). To distinguish between regions 512/515 and regions 521/522, regions 521 and 522 are called hybrid regions (as they include both driving and driven characteristics with more than one node order).

The dynamic current driving scheme can further divide the hybrid regions, i.e. regions 521 and 522, based on node order. For example, referring to FIG. 5D, region 521 can be divided into regions 511 and 514, wherein region 511 has only first order nodes and region 514 has only zero order nodes. Similarly, region 522 can be divided into regions 513 and 516, wherein region 513 has only first order nodes and region 516 has only second order nodes. Thus, after using a dynamic current driving scheme and referring also to FIG. 5B, region 511 includes three nodes 502A, 502B, and 502C; region 512 includes two nodes 501A and 501B; region 513 includes three nodes 502D, 502E, and 502F; region 514 includes two nodes 501C and 501D; region 515 includes three nodes 502G, 502H, and 502I; and region 516 includes two nodes 503A and 503B.

Figure 5D:
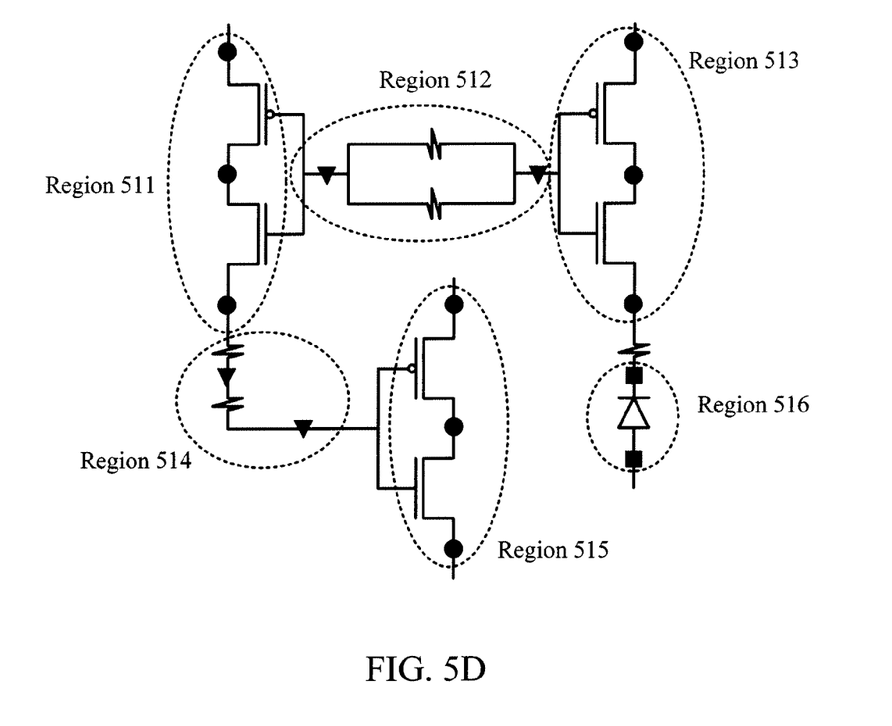
Figure 5E:
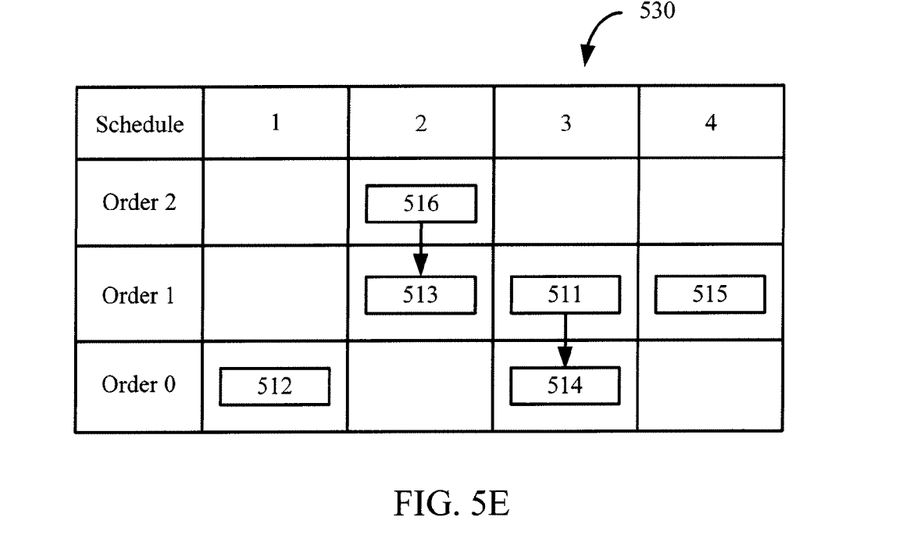
FIG. 5E illustrates an exemplary scheduling of the partitioned circuit of FIG. 5D.

FIG. 5E illustrates an exemplary schedule 530 of the analysis/simulation of the order-ranked hierarchy structure including regions 511-516 (i.e. the scheduling of these regions for analysis) using four time slots 1-4 (as determined by the static current driving scheme). Determining the priority of each of regions 511-516 in schedule 530 can be generated using the dynamic current driving scheme. Notably, each region defined by the static current driving scheme (see FIG. 5C) can be analyzed in one of time slots 1-4.

In accordance with one aspect of the invention, the scheduling priority can be based on current drivers and node orders in the regions. For example, in FIG. 5D, region 512 drives devices in both regions 511 and 513. Specifically, the nodes in region 512 only provide gate biases for transistors and therefore can be characterized as static current drivers (wherein any node that is not a static current driver is, by definition, a dynamic current driver) in a driver-only region. Moreover, the current through region 512 is not dependent on other regions. Based on its static current drivers and independence from other regions, region 512 has highest priority (irrespective of node order) and therefore can be scheduled in time slot 1.

In general, for slot designation, a higher order node region that drives devices of another region is solved before a lower order node region that drives devices of another region. Therefore, in FIG. 5D, region 516 (which has the highest order nodes of remaining regions 511, 513, 514, 515, and 516) should be analyzed in time slot 2. As described above, regions within one hybrid region are analyzed in the same time slot. Therefore, regions 516 and 513 can be solved in time slot 2.

In one embodiment, scheduling priorities in a hybrid region can be determined using the following steps (using regions 513 and 516 as an exemplary hybrid region). Note that these steps, which comprise a hierarchical solving technique, can be used for any pair of adjacent regions in a hybrid region to determine scheduling priority.

Construct a linearized model of region 513 at the current operating point, wherein the Schur complement is used for calculating load on the ports between regions 513 and 516.

Solve N>1 Newton-Raphson (NR) iterations of region 516 importing the linearized model of step 1 as a substitute for region 513 in the matrix.

Solve M: 1<M<N NR iterations of region 513 using the just obtained solution of region 516 as boundary conditions.

If region 513 contains non-linear elements (which it does in this case) iterate entire process until convergence is achieved at all nodes. The scheduling priority is determined based on the accuracy achieved for the regions after convergence, i.e. the scheduling priority providing the higher accuracy is chosen.

Note that as individual computations, constructing linearized models, using a Schur complement, solving Newton-Raphson iterations, and achieving convergence are known to those skilled in the art and therefore are not explained in detail herein.

At this point, region 511 has the highest order nodes of remaining regions 511, 514, and 515 and therefore should be solved in time slot 3. As described above, regions within one hybrid region are analyzed in the same time slot. Therefore, regions 511 and 514 can be solved in time slot 3. Note that the order of analysis between regions 511 and 514 can be determined using the same technique described for regions 513 and 516. In this case, it is determined that region 511 should be solved before region 514. With respect to hybrid regions, although it would appear that a region having a higher order of nodes is analyzed before a region having a lower order of nodes, this generalization may be incorrect. Therefore, in a preferred embodiment, the order of solving is determined using the hierarchical solving technique described above.

At this point, only region 515 remains and therefore it can be solved for analysis in time slot 4. As indicated by the static current driving scheme, region 515 is a driven-only region and therefore it should be performed after any region driving it in the circuit.

In this embodiment, analysis is performed from top to bottom and from bottom to top (FIG. 5D showing top to bottom). Note that the designation of "top to bottom" refers to higher order node regions being analyzed first with the exception of other lower order node regions driving them. In contrast, the designation of "bottom to top" refers to lower order node regions being analyzed first with the exception of that they are driving other higher order node regions.

Figure 6:
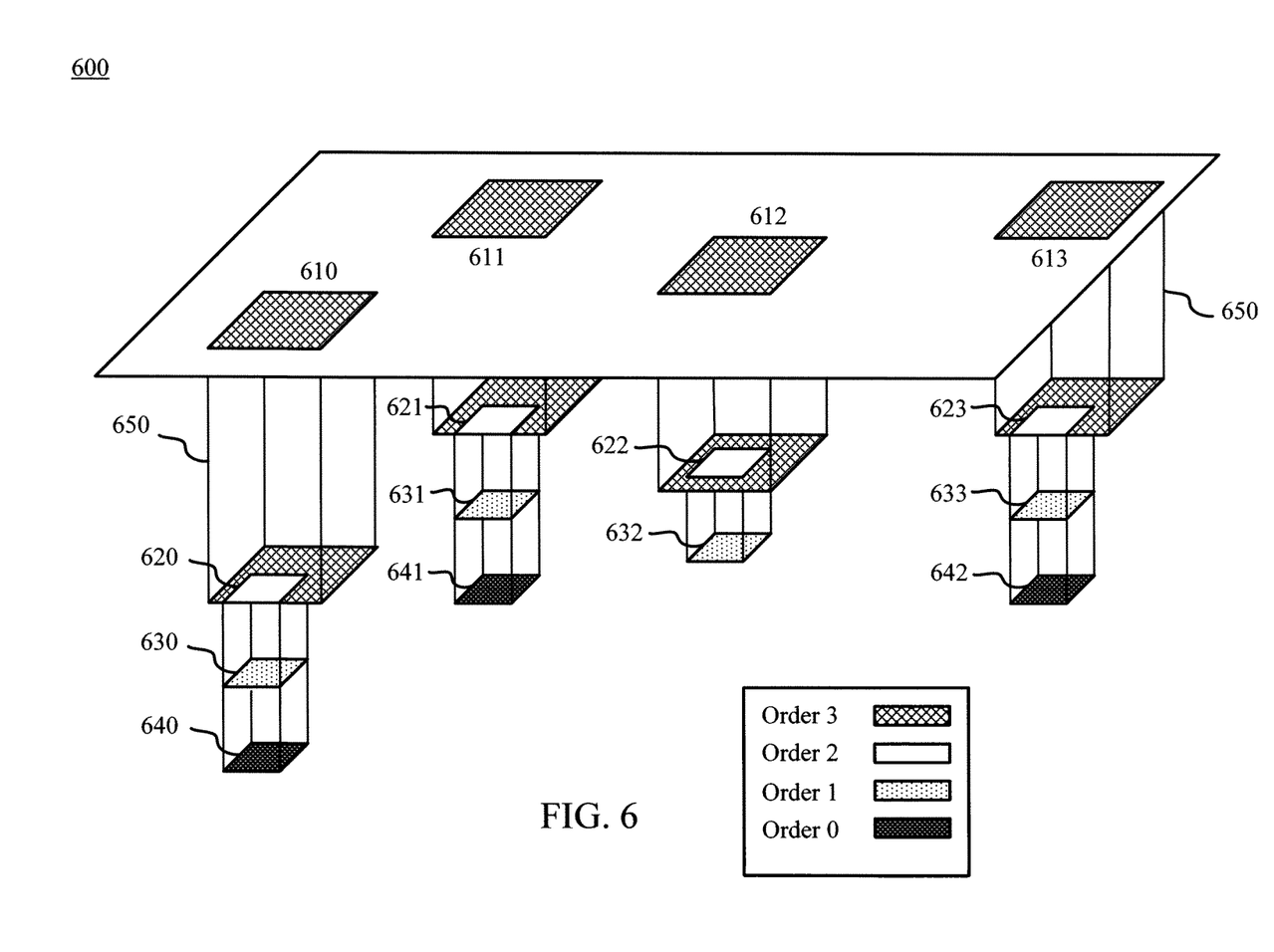
FIG. 6 illustrates another depiction of an order-ranked hierarchy in software coding form.

FIG. 6 illustrates another depiction of an order-ranked hierarchy 600 in software coding form. Specifically, order-ranked hierarchy 600 includes four orders (each order having a different fill pattern). Nodes 610, 611, 612, and 613 are order three; nodes 620, 621, 622, and 623 are order two; nodes 630, 631, 632, and 633 are order one; and nodes 640, 641, and 642 are order zero. In this particular circuit configuration, node 610 drives node 620, which in turn drives node 630, which in turn drives node 640.

As described above, the node's topology and physics provides information regarding "order" and "coupling", wherein order determines intrinsic properties of a specific node and coupling determines whether one or more neighbor nodes can be included in the same partition as the analyzed node based on a conductance or capacitance above a threshold value between those nodes. In general, nodes with the same order having at least a predetermined threshold of coupling can be placed in the same partition. Note that order-ranked hierarchy 600 indicates using vertical connectors 650 that data can be shared between driver nodes and driven nodes. In one embodiment, data sharing can also occur in each partition, i.e. isomorphism matching.

Figure 7:
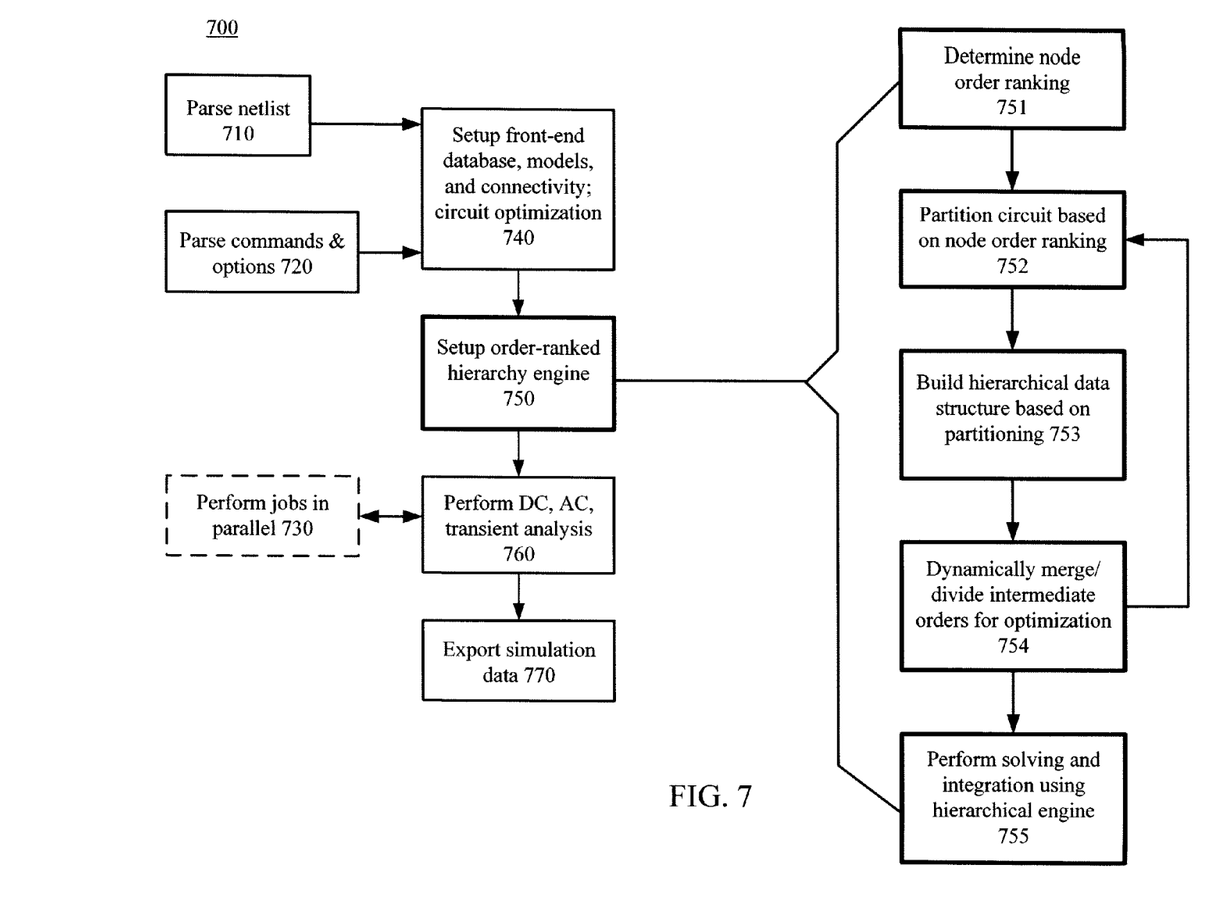
FIG. 7 illustrates an exemplary simulation flow including hierarchical order ranking.

FIG. 7 illustrates an exemplary simulation flow 700 including the above-described hierarchical order ranking. In step 710, a netlist is analyzed in an orderly manner, i.e. parsed. In step 720, available commands and options can be parsed. In step 740, using the results from the parsed netlist, commands, and options, a front-end database, models, and connectivity of the circuit can be setup. Preferably, because of the size of the circuit, step 740 also includes circuit optimization that generates a conventional, database hierarchy (i.e. an optimized hierarchical netlist). In one embodiment, step 740 can also include flattening this optimized hierarchical netlist, using a flattened front end database setup (wherein the "front end" refers to all processes before engine setup, e.g. parsing netlists, model setup, circuit connectivity setup, optimization setup), using a hierarchical front end database setup, or using a partially flattened hierarchical front end database setup. Using the optimized hierarchical netlist, step 750 then provides the setup of an order-ranked hierarchy engine. Using the order-ranked hierarchy engine, step 760 can perform DC, AC, and transient analysis. Step 770 can export the results of this analysis as simulation data.

Step 750 can include the following exemplary steps. Step 751 can determine the node order ranking of the nodes in the circuit. In one embodiment, this determination can include finding the maximum predetermined derivative ratio, which is described above. Step 752 can partition the circuit based on the current node order as well as the node's topology and physics (which includes using the static current driving scheme and then the dynamic current driving scheme). Step 753 can build a hierarchical data structure based on the partitioning. Note that this hierarchical data structure is significantly different from the optimized database hierarchy (which does not make a distinction between node orders). In one embodiment of simulation technique 700, the optimized database hierarchy (generated in step 740) can be retained to store information relating to the circuit that may not be stored by the node-order-ranked hierarchical data structure. Thus, step 760 can be performed with the benefit of information generated by both steps 740 and 750.

Step 754 can dynamically merge certain intermediate orders for system optimization. In one embodiment, step 754 can include determining the number of nodes associated with each node order and merging certain orders so that the number of nodes in each partition is more evenly distributed. For example, if ten orders result in partitions with significantly different number of nodes, then step 754 can merge certain adjacent orders (e.g. the second and third orders, or the ninth and tenth orders) to better distribute the nodes in the partitions, thereby providing increased system efficiencies (for example, in steps 730 and 760).

Note that dividing as well as merging orders can be performed in step 754. For example, if three orders result in partitions with significantly different number of nodes, then step 754 can divide certain orders (effectively creating more orders) to better distribute the nodes in the partitions. Thus, the "partitioning" (i.e. assuming all nodes from one piece, and then dividing up that piece into a certain number of pieces) of step 752 can also be characterized as "merging" (i.e. assuming each node is a piece and merging certain pieces to form a reduced number of pieces). Notably, the end result is the same, i.e. the optimized order-ranked hierarchy database.

In other words, using the initial definition of order ranking in step 751, steps 752 and 753 are performed to determine whether that order ranking results in an optimized partitioning of the circuit. Step 754 allows the current order ranking to be redefined in order to better partition the circuit and maximize simulation efficiencies. Steps 752-754 can be repeated until a predetermined optimization is realized. In one embodiment, a predetermined cost function can be used to balance the cost of each region solving for performance efficiency. Step 755 can perform solving and integration using the optimized hierarchical data structure and a hierarchical engine. Notably, this solving can be performed using separate matrices for different partitions. Thus, each matrix can be directed to a specific node order, which increases computation accuracy and efficiency.

Note that step 730 can optionally perform certain jobs of step 760 in parallel to increase system efficiency. Indeed, the node-ranked hierarchical partitions described above are naturally suited for parallel computation. For example, regions having the same node order can be analyzed (DC, AC, transient) in parallel. Moreover, a hierarchical partition typically results in a dense matrix for nodes with higher ranked orders. Advantageously, parallel matrix solvers work more efficiently with dense matrices than with sparse matrices.

Further note that the integration performed during step 755 can also benefit from the order-ranked hierarchy data structure. Specifically, the efficiency of integration can correlate to how well the integration method fits the signal's order. In a real circuit, a signal's behavior is determined not only by the stimulus, but also by the order of the loads in the signal path. Pure linear loads do not introduce any more non-linearity to the original signal, whereas paths with higher order loads add complexity to the original signal. Therefore, integration can be significantly more efficient when a lower order integration method can be applied to lower order network nodes and a higher order integration method can be applied to higher order network nodes.

Figure 8:
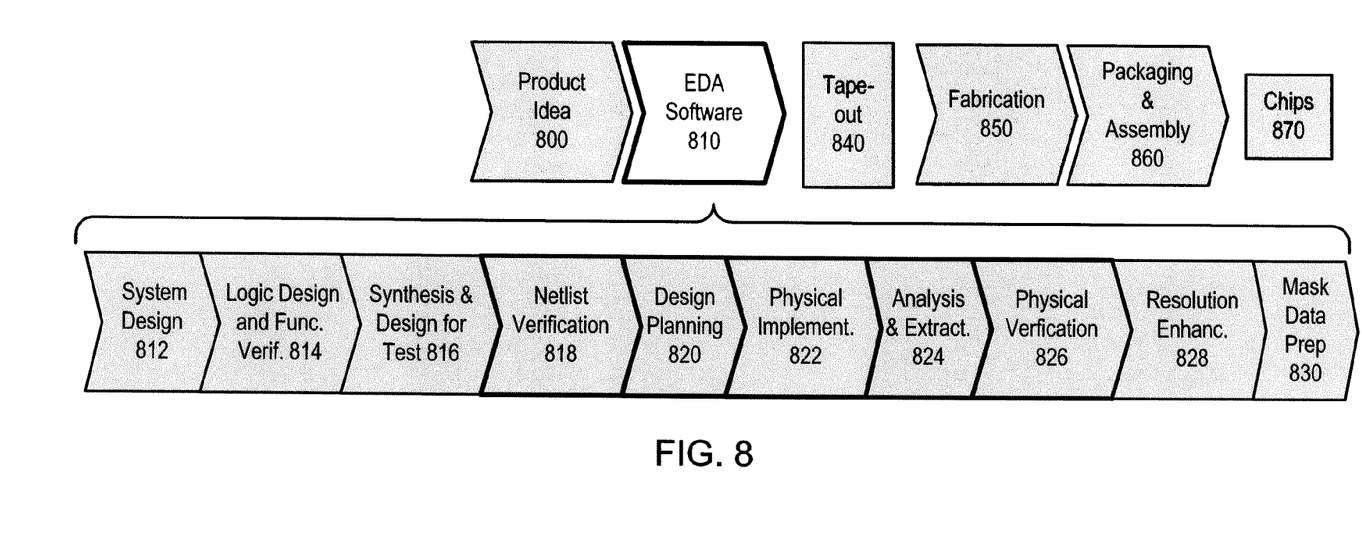
FIG. 8 shows a simplified representation of an exemplary digital ASIC design flow.

FIG. 8 shows a simplified representation of an exemplary digital ASIC design flow. At a high level, the process starts with the product idea (step 800) and is realized in an EDA software design process (step 810). When the design is finalized, it can be taped-out (event 840). After tape out, the fabrication process (step 850) and packaging and assembly processes (step 860) occur resulting, ultimately, in finished chips (result 870).

The EDA software design process (step 810) is actually composed of a number of steps 812-830, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC. A brief description of the components steps of the EDA software design process (step 810) will now be provided:

System design (step 812): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 814): At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include VCS, VERA, DesignWare®, Magellan, Formality, ESP and LEDA products.

Synthesis and design for test (step 816): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler, Tetramax, and DesignWare® products.

Netlist verification (step 818): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 820): Here, an overall floorplan for the chip is constructed and analyzed for timing and top-level routing. Exemplary EDA software products from Synopsys, Inc. that can be used at this step include Astro and IC Compiler products.

Physical implementation (step 822): The placement (positioning of circuit elements) and routing (connection of the same) occurs at this step. Exemplary EDA software products from Synopsys, Inc. that can be used at this step include the Astro and IC Compiler products.

Analysis and extraction (step 824): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 826): At this step various checking functions are performed to ensure correctness for: manufacturing, electrical issues, lithographic issues, and circuitry. Exemplary EDA software products from Synopsys, Inc. that can be used at this step include the Hercules product.

Resolution enhancement (step 828): This step involves geometric manipulations of the layout to improve manufacturability of the design. Exemplary EDA software products from Synopsys, Inc. that can be used at this step include Proteus, ProteusAF, and PSMGen products.

Mask data preparation (step 830): This step provides the "tape-out" data for production of masks for lithographic use to produce finished chips. Exemplary EDA software products from Synopsys, Inc. that can be used at this step include the CATS® family of products.

The invention can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of microcontrollers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Note that the above-described order-ranked hierarchical engine can be used in any simulation tool, i.e. both pre-layout and post-layout simulation. Therefore, with respect to FIG. 8, the order-ranked hierarchical engine can be used in any of steps 818-826. Current, exemplary simulation tools from Synopsys, Inc. include HSIM®, Nanosim®, StarSIM™, XA™, and HSPICE®. Advantageously, an order-ranked hierarchy engine can provide post-layout simulation accuracy with pre-layout simulation performance. For example, LNR with its attendant accuracy loss is unnecessary because the lowest order nodes (e.g. the linear nodes) need only one iteration to solve and each set of higher order nodes uses an appropriate number of iterations to ensure accuracy. Moreover, note that a pre-layout simulation typically includes relatively few nodes and thus has a correspondingly small matrix to solve. In contrast, a post-layout simulation typically includes many nodes and thus has a correspondingly large matrix to solve. The order-ranked hierarchical engine breaks these nodes in order-ranked sets of nodes, thereby ensuring relatively small matrices to solve. Therefore, the above-described node order simulation technique ensures the efficient use of system resources. Another problem of LNR is that the approximations of the first order (linear) of I(V, dV/dt, t) are causing accuracy out of control in orders higher than the first.

Additionally, as described briefly above, nodes with uniform order in a solved matrix ensure greater stability during DC and transient analysis. Specifically, in a DC operating point calculation, the initial guess is away from convergence and, under most circumstances, the initial guess is not within a convergence radius. In contrast, a transient calculation looks for the next convergence point based on the last convergence point and, in most circumstances, the last convergence point is inside the convergence radius. A "blow-up" is normally caused by the competition of moving nodes with different orders in the same matrix by using a guess (step) that is somewhere between the DC and transient convergence guesses. Advantageously, by using matrices having only nodes with the same order (or very close orders), convergence can be achieved rapidly and stably in either DC or transient analysis.

Note also that the above-described order ranked hierarchy has advantages to implement isomorphism matching and multi-rate event driven scheduling. The term "isomorphism matching" provides for data sharing including both circuit topology sharing and physics state sharing. Regions with same order have greater possibility to share the circuit topology and physics state. The term "multi-rate event driven scheduling" means evaluation rate (or time steps) among regions can be different and is driven by events. In other words, under a "static current driving" flow, which has relationship between drivers and loads, if drivers make no change, their loads are latent under certain period of time and therefore the loads' states do not need to be updated. In addition, the term "multi-rate" also means that it is not necessary for a region to take fixed time-step to be evaluated and time step length between two successive evaluations is determined by the activity of its driver signals and signals inside the region. The uniform models with the same current order in a single region are more accurate to predict its next time-step Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method of simulating an integrated circuit (IC) design, the method comprising:
accessing an optimized hierarchical netlist;
determining a node order ranking of nodes in the optimized hierarchical netlist, a node order being proportional to a maximum value of a derivative ratio;
partitioning circuits of the optimized hierarchical netlist with a static current driving scheme and a dynamic current driving scheme based on the node order ranking;
building a hierarchical data structure based on the partitioning;
merging intermediate node orders for optimization and re-partitioning the circuits based on at least one merged intermediate node order;
performing solving and integration using the hierarchical data structure to generate an order-ranked hierarchy;
performing analysis on the order-ranked hierarchy engine; and
exporting simulation data of the IC design based on the analysis.

2. The method of claim 1, wherein the merging intermediate node orders is performed dynamically.

3. The method of claim 1, wherein the node order ranking uses a derivative of a current as a function of a voltage I(V)

with respect to the voltage V for DC static behavior of a device that connects to a node being characterized.

4. The method of claim 1, wherein the node order ranking uses a derivative of a current as a function of a voltage, a derivative of the voltage with respect to a time, or the time I(V,dV/dt,t) with respect to the derivative of the voltage with respect to the time dV/dt for transient dynamic behavior of a device that connects to a node being characterized.

5. The method of claim 1, wherein the partitioning includes determining couplings between pairs of nodes with both static current driving and dynamic current driving schemes.

6. The method of claim 5, wherein the determining couplings includes determining a conductance between two nodes, and the partitioning includes placing the two nodes in a same region when the two nodes have a same order and the conductance is greater than a predetermined value.

7. The method of claim 5, wherein the determining couplings includes determining a capacitance between two nodes, and the partitioning includes placing the two nodes in a same region when the two nodes have a same order and the capacitance is greater than a predetermined value.

8. The method of claim 1, wherein the performing analysis includes performing at least one of DC, transient, and AC analysis.

9. The method of claim 8, wherein the performing analysis includes performing DC, transient, and AC analysis.

10. The method of claim 9, further including performing at least two of the DC, transient, and AC analysis in parallel.

11. A non-transitory computer-readable medium storing computer-executable instructions for simulating an integrated circuit (IC) design, which when executed by a computer performs steps comprising:
  accessing an optimized hierarchical netlist;
  determining a node order ranking of nodes in the optimized hierarchical netlist, a node order being proportional to a maximum value of a derivative ratio;
  partitioning circuits of the optimized hierarchical netlist based on the node order ranking with a static current driving scheme and a dynamic current driving scheme;
  building a hierarchical data structure based on the partitioning;
  merging intermediate node orders for optimization and re-partitioning the circuits based on at least one merged intermediate node order;
  performing solving and integration using the hierarchical data structure to generate an order-ranked hierarchy;
  performing analysis on the order-ranked hierarchy; and
  exporting simulation data of the IC design based on the analysis.

12. The computer-readable medium of claim 11, wherein the merging intermediate node orders is performed dynamically.

13. The computer-readable medium of claim 11, wherein the node order ranking uses a derivative of a current as a function of a voltage I(V) with respect to the voltage V for DC static behavior of a device that connects to a node being characterized.

14. The computer-readable medium of claim 11, wherein the node order ranking uses a derivative of a current as a function of a voltage, a derivative of the voltage with respect to a time, or the time I(V,dV/dt,t) with respect to the derivative of the voltage with respect to the time dV/dt for transient dynamic behavior of a device that connects to a node being characterized.

15. The computer-readable medium of claim 11, wherein the partitioning includes determining couplings between pairs of nodes with both static current driving and dynamic current driving schemes.

16. The computer-readable medium of claim 15, wherein the determining couplings includes determining a conductance between two nodes, and the partitioning includes placing the two nodes in a same region when the two nodes have a same order and the conductance is greater than a predetermined value.

17. The computer-readable medium of claim 15, wherein the determining couplings includes determining a capacitance between two nodes, and the partitioning includes placing the two nodes in a same region when the two nodes have a same order and the capacitance is greater than a predetermined value.

* * * * *